(12) United States Patent
Nishijima et al.

(10) Patent No.: US 10,837,939 B2
(45) Date of Patent: Nov. 17, 2020

(54) GAS SENSOR ELEMENT

(71) Applicants: TOYOTA JIDOSHA KABUSHIKI KAISHA, Toyota (JP); DENSO CORPORATION, Aichi (JP)

(72) Inventors: Hiroki Nishijima, Nisshin (JP); Yoshiharu Miyake, Miyoshi (JP); Haruki Kondo, Okazaki (JP); Yasushi Hirata, Toyota (JP); Hirofumi Suzuki, Kariya (JP); Kei Sugiura, Kariya (JP); Toru Takeuchi, Kariya (JP)

(73) Assignees: TOYOTA JIDOSHA KABUSHIKI KAISHA, Toyota (JP); DENSO CORPORATION, Aichi (JP)

( * ) Notice: Subject to any disclaimer, the term of this patent is extended or adjusted under 35 U.S.C. 154(b) by 109 days.

(21) Appl. No.: 16/256,680

(22) Filed: Jan. 24, 2019

(65) Prior Publication Data
US 2019/0242848 A1    Aug. 8, 2019

(30) Foreign Application Priority Data
Feb. 6, 2018    (JP) .................... 2018-019006

(51) Int. Cl.
*G01N 27/407*   (2006.01)
*G01N 27/406*   (2006.01)
*G01N 27/409*   (2006.01)

(52) U.S. Cl.
CPC ....... *G01N 27/4077* (2013.01); *G01N 27/409* (2013.01); *G01N 27/4067* (2013.01); *G01N 27/4071* (2013.01); *G01N 27/4075* (2013.01)

(58) Field of Classification Search
None
See application file for complete search history.

(56) References Cited

U.S. PATENT DOCUMENTS

2016/0018357 A1    1/2016    Nishijima et al.

FOREIGN PATENT DOCUMENTS

EP    0066852 A2    12/1982
JP    2016-29360 A    3/2016

*Primary Examiner* — J. Christopher Ball
(74) *Attorney, Agent, or Firm* — Oliff PLC

(57) ABSTRACT

The present disclosure provides a gas sensor element comprising a porous protective layer with improved water repellency upon continuously water pouring, which is a gas sensor element comprising:
a detection portion; and
a porous protective layer formed around the detection portion, wherein
the porous protective layer is formed from an aggregate containing alumina and a coating material containing silica, and
in the porous protective layer, the weight concentration x % by weight of the coating material with respect to the total weight of the aggregate and the coating material, and the porosity y %, satisfy the following formula (1):

$$y \leq 0.0058x^2 - 1.2666x + 68 \qquad (1), \text{ and}$$

in the porous protective layer, the pore volume of pores having a pore diameter of 100 nm or less is 0.02 mL/g or less.

4 Claims, 10 Drawing Sheets

7A

7B

GAS SENSOR ELEMENT

CROSS REFERENCE TO RELATED APPLICATIONS

The present application claims priority from Japanese patent application JP 2018-019006 filed on Feb. 6, 2018, the content of which is hereby incorporated by reference into this application.

BACKGROUND

Technical Field

The present disclosure relates to a gas sensor element that is mounted on a vehicle, for example, and detects the concentration of oxygen or NOx in the exhaust gas.

Background Art

In a variety of industries, a variety of attempts has been made worldwide to reduce environmental impacts and burdens. In particular, in the automobile industry, development for promoting the spread of not only fuel-efficient gasoline engine vehicles, but also so-called eco-friendly vehicles, such as hybrid vehicles or electric vehicles, as well as for further improving the performance of such vehicles has been advanced day by day.

Purification of exhaust gas and improvement of fuel economy performance of vehicles have been conducted by detecting the concentration of oxygen or NOx in a measurement target gas, such as exhaust gas, using a gas sensor and precisely controlling the fuel oil consumption and the intake air amount.

An exemplary basic configuration of a gas sensor element that constitutes such a gas sensor includes a detection portion, which has a stack of a solid electrolyte body having a pair of electrodes on opposite sides thereof and a heat generating body including a heat generating source, and a porous protective layer formed around the detection portion.

A gas sensor detects the concentration of oxygen or NOx in the exhaust gas at a temperature as high as about 400° C. to 850° C. Thus, if water droplets (i.e., condensed water) in the exhaust gas collide with the gas sensor element that constitute the gas sensor, thermal shock may be generated due to partial quenching, and the function of the gas sensor may be decreased.

In order to eliminate such concern, a porous protective layer having water repellency is provided around the detection portion of the gas sensor element.

Herein, as a conventional technique regarding a gas sensor element comprising a porous protective layer having water repellency, for example, JP 2016-29360 A discloses a gas sensor element comprising a porous protective layer, in which the thermal conductivity λ is in the range of 0.2 to 5 W/mK, and the product λCpp of the thermal conductivity λ (W/mK), the density p (g/m$^3$) and the specific heat Cp (J/gK) is in the range of 5.3×10$^5$ to 2.1×10$^7$ WJ/m$^4$K$^2$.

The water repellency of the porous protective layer disclosed in JP 2016-29360 A is obtained by Leidenfrost phenomenon. Leidenfrost phenomenon is a phenomenon by which the surface of a water droplet is instantly evaporated, when the water droplet is allowed to come into contact with the surface of a porous protective layer at a high temperature, and a blocking layer (vapor film) is formed between the surface of the porous protective layer and the water droplet due to the evaporated water vapor. According to this Leidenfrost phenomenon, even in a case where water droplets adhere to the surface of a porous protective layer, the water droplets are instantly separated from the surface of the porous protective layer, and this means that the porous protective layer has water repellency.

However, in the case of a gas sensor element comprising a porous protective layer having water repellency, as disclosed in JP 2016-29360 A, when condensed water contained in the exhaust gas is continuously poured onto a site in the high-temperature gas sensor element, the water repellency of the porous protective layer is not sufficient in some cases. For example, the porous protective layer of the gas sensor element disclosed in JP 2016-29360 A exhibits PTC (Positive Temperature Coefficient) characteristics, by which the thermal conductivity decreases with a decrease in the temperature. Accordingly, when the temperature of the porous protective layer is decreased by continuous water pouring, its thermal conductivity is decreased, and a vapor film is hardly formed according to the Leidenfrost phenomenon. As a result, water repellency is reduced, and a great thermal shock towards the gas sensor element is thereby generated.

SUMMARY

As described above, in the case of a conventional gas sensor element comprising a porous protective layer having water repellency, the water repellency is reduced due to a decrease in the temperature upon continuous water pouring, and as a result, a great thermal shock towards the gas sensor element is generated in some cases. Hence, the present disclosure provides a gas sensor element comprising a porous protective layer with improved water repellency, when water is continuously poured onto the porous protective layer.

As a result of intensive studies directed towards achieving the aforementioned object, the present inventors have found that NTC (Negative Temperature Coefficient) characteristics, by which thermal conductivity increases with a decrease in the temperature, can be imparted to the porous protective layer of a gas sensor element by controlling the weight concentration of a coating material and the porosity in the porous protective layer of the gas sensor element to satisfy a predetermined relational expression, and water repellency is improved upon continuous water pouring, thereby completing the present disclosure. Specifically, the gist of the present disclosure is as follows.

(1) A gas sensor element comprising:

a detection portion having a stack of a solid electrolyte body and a heat generating body, the solid electrolyte body having at least a pair of electrodes on opposite sides thereof and the heat generating body including a heat generating source; and a porous protective layer formed around the detection portion, wherein the porous protective layer is formed from an aggregate containing alumina and a coating material containing silica, and in the porous protective layer, the weight concentration x % by weight of the coating material with respect to the total weight of the aggregate and the coating material, and the porosity y %, satisfy the following formula (1):

$$y \leq 0.0058x^2 - 1.2666x + 68 \qquad (1)$$

and, in the porous protective layer, the pore volume of pores having a pore diameter of 100 nm or less is 0.02 mL/g or less.

(2) The gas sensor element according to the above (1), wherein the weight concentration of the coating material in the porous protective layer is 10% by weight or more.

(3) The gas sensor element according to the above (1) or (2), wherein the porosity of the porous protective layer is 25% or more.

(4) A method for producing the gas sensor element according to any one of the above (1) to (3), comprising:

forming a porous protective layer from an aggregate containing alumina and a coating material containing silica, around the detection portion; and baking the formed porous protective layer at 1000° C. or higher.

According to the present disclosure, there can be provided a gas sensor element comprising a porous protective layer with improved water repellency upon continuous water pouring.

DETAILED DESCRIPTION

Hereinafter, the present disclosure will be described in detail.

In the gas sensor element of the present disclosure, a solid electrolyte body having at least a pair of electrodes on opposite sides thereof and a heat generating body including a heat generating source are laminated on each other to form a detection portion, and a porous protective layer is formed around this detection portion.

Figure 1:
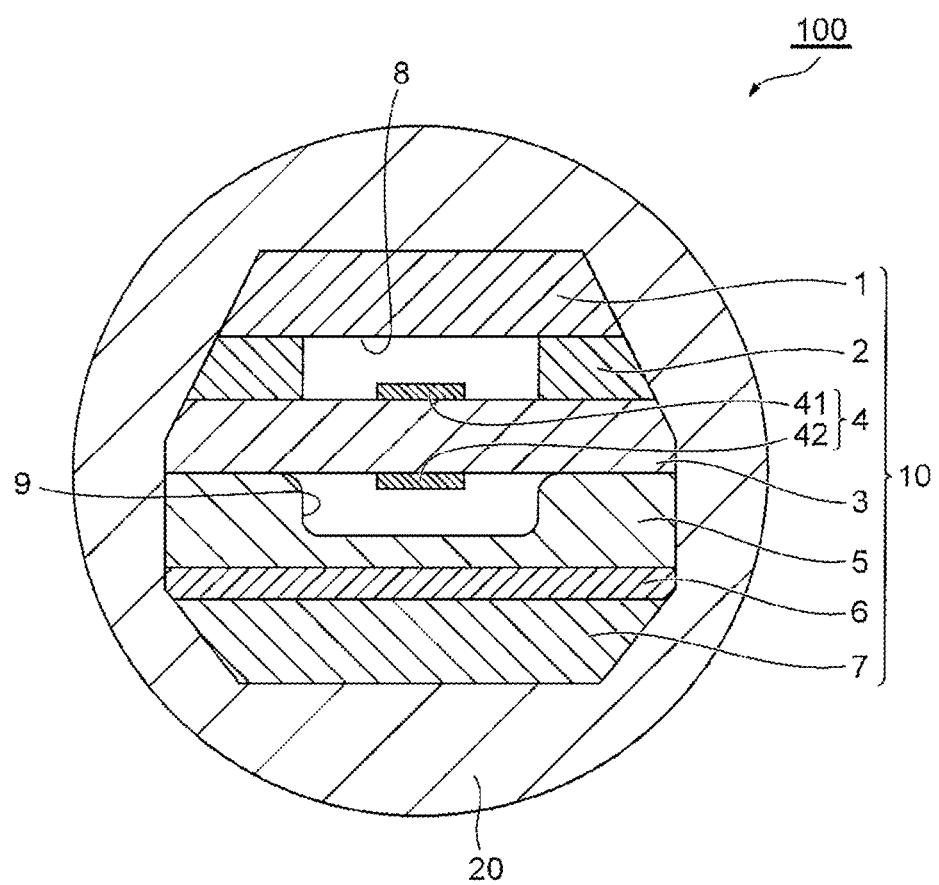
FIG. 1 is a schematic diagram illustrating one embodiment of a gas sensor element of the present disclosure.

FIG. 1 is a schematic diagram illustrating one embodiment of a gas sensor element of the present disclosure. A gas sensor element 100 shown in FIG. 1 generally includes a detection portion 10 that detects the concentration of oxygen or NOx in the exhaust gas, and a porous protective layer 20 that protects the periphery of the detection portion 10 against moisture in the exhaust gas and thus suppresses generation of a decrease in outputs that would otherwise occur due to a temperature drop of the detection portion 10 resulting from the moisture reaching the detection portion 10, and also traps toxic substances and the like in the exhaust gas that pass therethrough.

The detection portion 10 generally includes a solid electrolyte layer 3, which has on opposite sides thereof a pair of electrodes 4 including an electrode 41 on the measurement target gas side and an electrode 42 on the reference gas side, a porous diffusive resistance layer 2 that surrounds the electrode 41 on the measurement target gas side via a measurement target gas space 8, a shielding layer 1 that defines the measurement target gas space 8 together with the porous diffusive resistance layer 2, a reference gas space protective layer 5 that surrounds the electrode 42 on the reference gas side via a reference gas space 9, and a heat generating source 6 and a heat generating source substrate 7.

The heat generating source 6 includes a heater that is a heat generating body, and forms a heating region of the gas sensor element 100 so that it is heat-controlled to attain the activation temperature thereof.

The detection portion 10 has, in the cross-sectional shape shown in the drawing, corner portions that are cut out in taper shapes. With such cutout portions, the thickness of the porous protective layer 20 at the corresponding portions of the detection portion 10 is ensured.

The solid electrolyte layer 3 is formed of zirconia, and the electrode 41 on measurement target gas side and the electrode 42 on the reference gas side are each formed of platinum. In addition, the shielding layer 1 and the reference gas space protective layer 5 each exhibit a gas impermeable internal structure, and are formed of alumina.

Voltage at which the oxygen concentration difference and current have a linear correlation is applied across the pair of electrodes 4, and a measurement target gas is made to contact the electrode 41 on the measurement target gas side, while a reference gas, such as air, is made to contact the electrode 42 on the reference gas side. Then, the value of current generated between the electrodes in accordance with each oxygen concentration difference is measured, so that the air-fuel ratio of the vehicle engine can be identified on the basis of the measured current.

Figure 10:
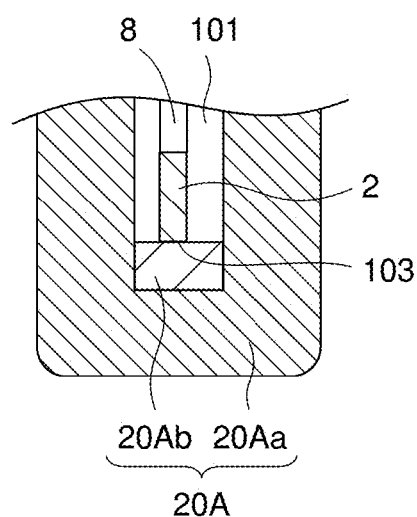
FIG. 10 is an enlarged diagram showing an end portion of one embodiment of a gas sensor element of the present disclosure.

The porous diffusive resistance layer 2 is provided at a position that defines the measurement target gas space 8 around the electrode 41 on the measurement target gas side to suppress the amount of the measurement target gas introduced to the electrode 41 on the measurement target gas side, and is configured to further introduce hydrogen gas, carbon monoxide gas, oxygen gas, and the like of the exhaust gas, which have been introduced via the porous protective layer 20 around the detection portion 10, into the measurement target gas space 8 via the porous diffusive resistance layer 2. In addition, as shown in FIG. 10, the porous protective layer of the present disclosure that satisfies the after-mentioned formula (1) can also be applied to a gas sensor element having a structure in which a gas introduction port is disposed at an end portion of the gas sensor element. FIG. 10 is an enlarged diagram showing an end portion of one embodiment of a gas sensor element of the present disclosure. In FIG. 10, a gas introduction port 103 is disposed at an end portion of a gas sensor element 101. Since a porous protective layer 20A (an upper layer 20Aa and a lower layer 20Ab) is formed at a lower portion of the end portion of the gas sensor element 101, it is apart from the heat generating portion, and thus, heat hardly reaches the porous protective layer, and the temperature is hardly increased. As a result, due to a decrease in the temperature upon continuous water pouring, water repellency is easily reduced. By adopting the porous protective layer of the present disclosure, such deficiency is compensated, and favorable water repellency is obtained.

The porous protective layer 20 is a porous layer, which optionally has noble metal catalyst particles (not shown) supported on its surface. The noble metal catalyst particles in the porous protective layer 20 may be distributed across the entire region of the porous protective layer 20, or may also be distributed only in the lateral region thereof corresponding to the porous diffusive resistance layer 2 in proximity to the electrode 41 on the measurement target gas side. Alternatively, the amount of noble metal catalyst particles that are supported in the porous protective layer 20 may be distributed such that a relatively larger amount of noble metal catalyst particles are supported in a region corresponding to the porous diffusive resistance layer 2, for example. Herein, as the noble metal catalyst particles, platinum, palladium or rhodium may be used alone, or an alloy containing two or more of palladium, rhodium, and platinum may be used.

Figure 9:
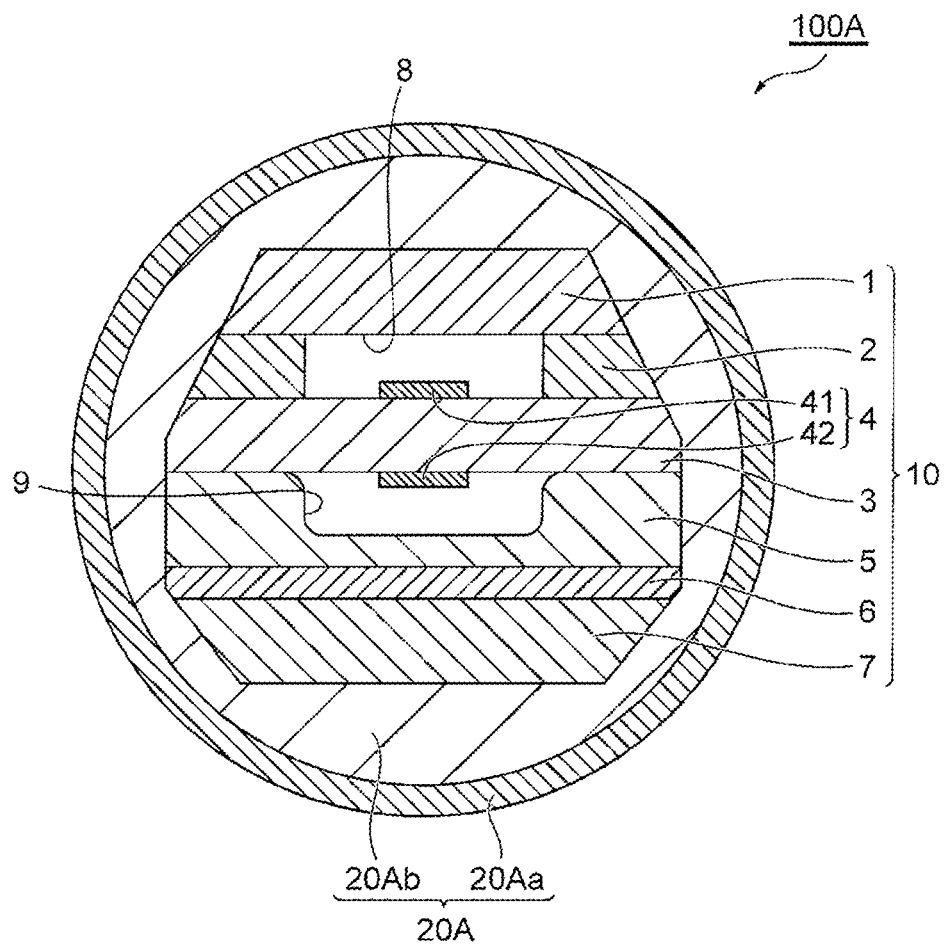
FIG. 9 is a schematic diagram illustrating one embodiment of a gas sensor element of the present disclosure.

The porous protective layer 20 may have a single-layer structure, as shown in FIG. 1. On the other hand, the porous protective layer 20 may also have a two-layer laminated structure, as shown in FIG. 9, in which the porous protective layer 20A is composed of a lower layer 20Ab in contact with the detection portion 10 located inside of the gas sensor element 100A and an upper layer 20Aa in contact with the outside thereof. In this case, since the porous protective layer of the present disclosure that satisfies the after-mentioned formula (1) has excellent water repellency, it may be applied to the upper layer 20Aa. In addition, the lower layer 20Ab can be used as a poisoning suppression layer. When the porosity of such a poisoning suppression layer is set at lower than that of the upper layer 20Aa, the poisoning suppression layer becomes a porous layer having a specific surface area that is larger than the upper layer 20Aa, and thus, the poison-capturing properties of the poisoning suppression layer can be ensured. In some embodiments, the porous protective layer 20A having a two-layer laminated structure consists of a lower layer 20Ab used as a poisoning suppression layer and an upper layer 20Aa to which the porous protective layer of the present disclosure is applied.

The gas sensor element of the present disclosure is characterized in that the porous protective layer 20 exhibits NTC characteristics. Hereafter, the porous protective layer will be described.

The porous protective layer is formed from an aggregate containing alumina ($Al_2O_3$) and a coating material containing silica ($SiO_2$). A number of aggregates containing alumina are linked to one another by the coating material containing silica, which serves as a binder, whereby a porous protective layer is formed.

The type of alumina contained in the aggregate is not particularly limited, and any of α-alumina, γ-alumina, and θ-alumina can be used. The aggregate may contain components other than alumina, as long as it satisfies the after-mentioned formula (1). Examples of such other components include spinel, silicon carbide, and aluminum nitride. The aggregate consists of alumina in some embodiments.

The coating material may contain components other than silica, as long as it satisfies the after-mentioned formula (1). Examples of such other components include titania, zirconia, antimony oxide, and zinc oxide. The coating material consists of silica in some embodiments.

In the porous protective layer, the pore volume of pores having a pore diameter of 100 nm or less is 0.02 mL/g or less. By decreasing pores with a pore diameter of 100 nm or less, which is the mean free path or less, at which gaseous molecules hardly move, thermal conductivity can be improved. Herein, the term "pore diameter" is used to mean a pore diameter (average pore diameter) obtained by measuring it according to a gas adsorption method, a mercury intrusion method and the like. The pore volume (also referred to as "integrated pore volume") of pores with a pore diameter of 100 nm or less can be obtained by a gas adsorption method, a mercury intrusion method, and the like. Upon production of a porous protective layer, a coating material is melted by being baking at a temperature of 1000° C. or higher, and 1100° C. or higher in some embodiments, so that the pore volume of pores with a pore diameter of 100 nm or less can be set at 0.02 mL/g or less. Moreover, by melting the coating material, the strength of the porous protective layer is improved.

In the porous protective layer, the weight concentration x % by weight of the coating material with respect to the total weight of the aggregate and the coating material, and the porosity y % of the porous protective layer, satisfy the following formula (1):

$$y \leq 0.0058x^2 - 1.2666x + 68 \tag{1}$$

Besides, the porosity is not 0% (y≠0).

The porous protective layer that satisfies the above formula (1) exhibits NTC characteristics. In the present disclosure, the "NTC characteristics" mean that thermal conductivity increases with a decrease in the temperature. Since the porous protective layer of the present disclosure exhibits NTC characteristics, it can exhibit favorable water repellency, even when condensed water contained in the exhaust gas is continuously poured thereon.

The water-repellent mechanism of a porous protective layer that satisfies the above-described formula (1) and exhibits NTC characteristics, upon continuous water pouring, will be described below. Specifically, when condensed water in the exhaust gas is continuously poured onto the porous protective layer of a gas sensor element at a high temperature, the temperature of the porous protective layer is decreased. The heat-supplying ability (heat flux) of the porous protective layer is increased in proportion to the thermal conductivity thereof. Since the thermal conductivity of the porous protective layer exhibiting NTC characteristics is increased with a decreased in the temperature, the heat-supplying ability is increased. When the heat-supplying ability of the porous protective layer is increased, a vapor film is easily formed according to the Leidenfrost phenomenon. Thus, the porous protective layer exhibits favorable water repellency. Hence, even when water is continuously poured onto the porous protective layer, the water repellency of the porous protective layer is not decreased, and thermal shock towards the gas sensor element can be reduced. As such, the porous protective layer exhibiting NTC characteristics exhibits excellent water repellency at a low temperature, when compared with a protective layer exhibiting PTC characteristics, by which thermal conductivity is decreased with a decrease in the temperature.

The weight concentration x of a coating material to the total weight of an aggregate and a coating material in a porous protective layer is 10% by weight or more in some embodiments, and 10% by weight to 35% by weight in further embodiments. When the weight concentration of the coating material that acts to link aggregates to one another is 10% by weight or more, the high strength of the porous protective layer is ensured. On the other hand, when it is 35% by weight or less, a state in which the coating material is uniformly dispersed in the porous protective layer can be maintained.

In addition, the porosity y of the porous protective layer is 25% or more in some embodiments, and 25% to 55% in further embodiments. When the porosity of the porous protective layer is 25% or more, exhaust gas permeability becomes sufficiently high, and thus, the response characteristic of sensor output to a change in the exhaust gas atmosphere becomes sufficiently high. On the other hand, when it is 55% or less, a reduction in the strength of the porous protective layer can be suppressed.

The present disclosure also includes a method for producing a gas sensor element comprising the above-described porous protective layer. The method for producing the gas sensor element of the present disclosure comprises: forming a porous protective layer from an aggregate containing alumina and a coating material containing silica, around a detection portion; and baking the formed porous protective layer at 1000° C. or higher.

In forming a porous protective layer, the porous protective layer can be formed, for example, by a dip method, a molding method providing good film thickness dimensional accuracy, or a thermal spraying method that is suitable for producing a compact layer. The dip method or the thermal spraying method is selected depending on the porosity of the porous protective layer.

When the porous protective layer is formed by the dip method, for example, an operation to immerse a detection portion in slurry containing an aggregate and a coating material, and to remove it from the slurry and then dry it, is repeated several times until a layer having a predetermined thickness can be obtained. The slurry containing an aggregate and a coating material is obtained, for example, by dispersing an aggregate and a coating material in a solvent (water, etc.), optionally using a disperser (polyvinyl alcohol (PVA), etc.). Alumina serving as an aggregate can be used, for example, in the form of alumina powders. Meanwhile, silica serving as a coating material may be used either in a crystalline form or an amorphous form. Amorphous silica is used in some embodiments. When silica sol is used as such silica, in order to set the weight concentration of a coating material in the obtained porous protective layer, for example, at 20% by weight, approximately 38.5% by weight of the silica sol is needed because the silica sol is an aqueous solution of 40% by weight of silica.

When the porous protective layer is formed by the thermal spraying method, for example, mixed powders or slurry containing an aggregate and a coating material are melted or are converted to a state close to such a melted state at a high temperature, and the resultant is then sprayed to a detection portion, so as to form a porous protective layer.

In baking the porous protective layer, the thus formed porous protective layer is baked. The baking temperature is 1000° C. or higher, and 1100° C. or higher in some embodiments. The baking temperature is, for example, 1000° C. to 1200° C., 1050° C. to 1150° C. in some embodiments, and 1100° C. in further embodiments. When the baking temperature is 1000° C. or higher, the coating material (silica) is melted, and the pore volume of pores with a pore diameter of 100 nm or less can be set at 0.02 mL/g or less. Accordingly, the thermal conductivity and strength of the porous protective layer are improved, in comparison to the case of baking a porous protective layer at a temperature of lower than 1000° C., at which a coating material is not completely melted. The baking time can be selected, as appropriate, depending on the baking temperature. The baking time is generally 0.5 hours to 2 hours.

EXAMPLES

Hereinafter, the present disclosure will be described in more detail in the following example and comparative examples. However, these examples are not intended to limit the scope of the present disclosure.

1. Production of Porous Protective Layer

A porous protective layer was produced using alumina ($Al_2O_3$) as an aggregate and also using silica ($SiO_2$) as a coating material, and the produced porous protective layer was then disposed around the detection portion of a gas sensor element, so as to produce the gas sensor element shown in FIG. 1. Herein, the alumina used as an aggregate exhibited NTC characteristics. The silica used as a coating material exhibited PTC characteristics and influenced the porosity. Thus, the porous protective layers of Example 1 and Comparative Examples 1 and 2, in which the component ratio between alumina and silica, and the porosity were changed, were produced, and a relational expression necessary for imparting NTC characteristics to the porous protective layer was obtained.

Example 1

Alumina powders (mean particle diameter: 10 μm) and silica powders (mean particle diameter: 15 nm) were dispersed in water, using a disperser, to generate slurry. The weight concentration of the solid content of silica with respect to the total weight of the solid contents of alumina and silica in the slurry was set at 21% by weight. According to the dip method, 60 mg of the generated slurry was allowed to adhere around the detection portion of a gas sensor element, and was then baked in the atmosphere at 1100° C. for 2 hours to produce a porous protective layer. The porosity of the porous protective layer was measured to be 37% according to the mercury intrusion method.

Comparative Example 1

Silica powders (mean particle diameter: 10 nm) were dispersed in water, using a disperser, to generate slurry. According to the dip method, 60 mg of the generated slurry was allowed to adhere around the detection portion of a gas sensor element, and was then baked in the atmosphere at 1100° C. for 4 hours to produce a porous protective layer. The porosity of the porous protective layer was 0.7%.

Comparative Example 2

A porous protective layer was produced in the same manner as that of Example 1, with the exceptions that the amounts of alumina and silica in slurry were changed so that the weight concentration of the solid content of silica with respect to the total weight of the solid contents of alumina and silica in the slurry was set at 22% by weight, and that the porosity of the porous protective layer was set at 49%.

2. Evaluation of Thermal Conductive Properties

Figure 2:
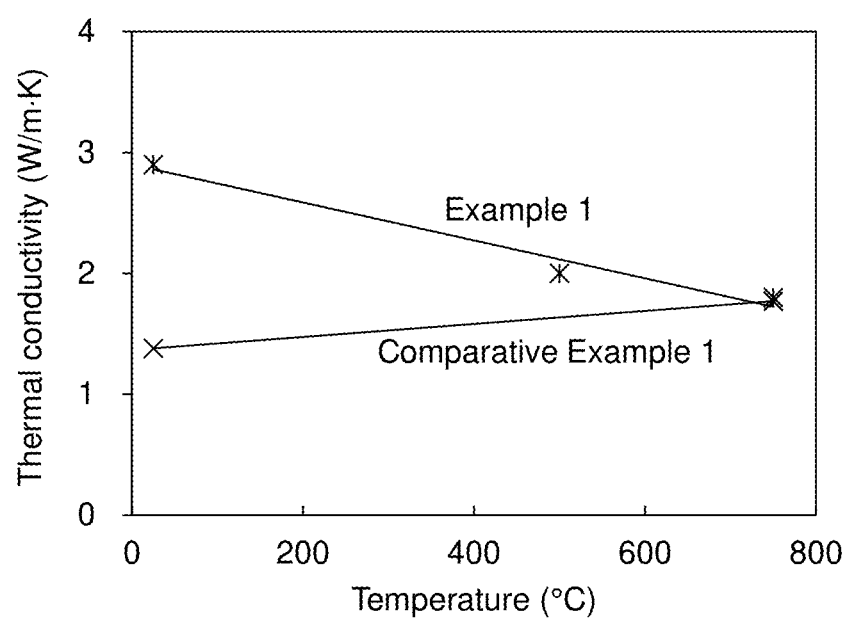
FIG. 2 is a diagram showing the relationship between temperature and thermal conductivity, with regard to the porous protective layers of Example 1 and Comparative Example 1.

The porous protective layers of Example 1 and Comparative Examples 1 and 2 were measured in terms of the relationship between temperature and thermal conductivity. FIG. 2 shows the relationship between temperature and thermal conductivity, with regard to the porous protective layers of Example 1 and Comparative Example 1. As shown in FIG. 2, the porous protective layer of Example 1 exhibited NTC characteristics, by which thermal conductivity was increased with a decrease in the temperature. In contrast, the porous protective layer of Comparative Example 1 exhibited PTC characteristics, by which thermal conductivity was decreased with a decrease in the temperature. Moreover, the porous protective layer of Comparative Example 2 exhibited PTC characteristics, although it is not shown in the figures.

Figure 3:
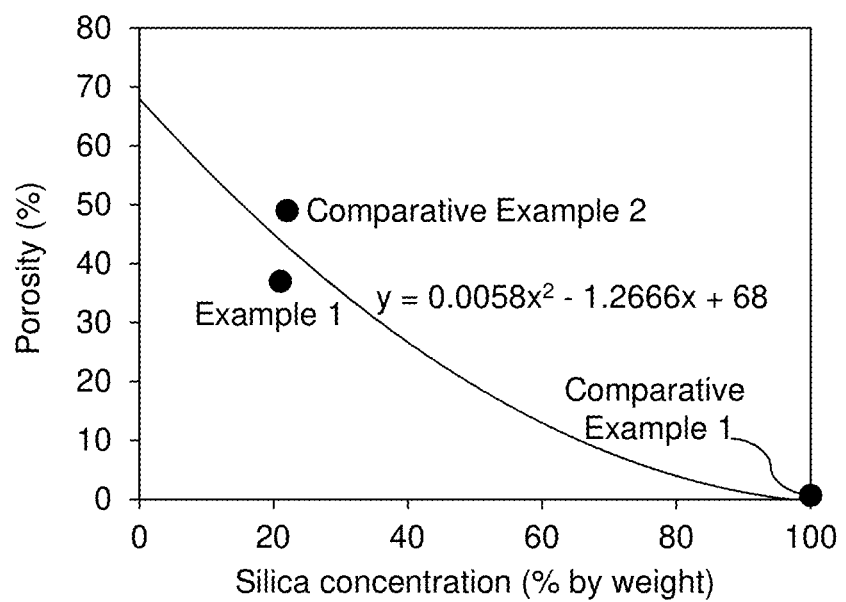
FIG. 3 is a diagram showing the relationship between the weight concentration of silica and porosity, in the porous protective layers of Example 1 and Comparative Examples 1 and 2.

Subsequently, a relational expression necessary for imparting NTC characteristics to the porous protective layer was obtained. As described above, it is considered that the component ratio between alumina used as an aggregate and silica used as a coating material in the porous protective layer and the porosity of the porous protective layer have an influence on imparting NTC characteristics to the porous protective layer. Thus, from the results obtained by confirming the thermal conductive properties of the porous protective layers of Example 1 and Comparative Examples 1 and 2, a relational expression (formula (1)) between the weight concentration of silica used as a coating material in the porous protective layer and the porosity of the porous protective layer, which is necessary for imparting NTC characteristics to the porous protective layer, was obtained. FIG. 3 shows the relationship between the weight concentration of silica and the porosity in the porous protective layers of Example 1 and Comparative Examples 1 and 2. As shown in FIG. 3, when the weight concentration x % by weight of the coating material with respect to the total weight of the aggregate and the coating material in the porous protective layer, and the porosity y % of the porous protective layer, satisfied the following formula (1):

$$y \leq 0.0058x^2 - 1.2666x + 68 \tag{1},$$

the material exhibited NTC characteristics.

3. Evaluation of Water Repellency

Figure 4:
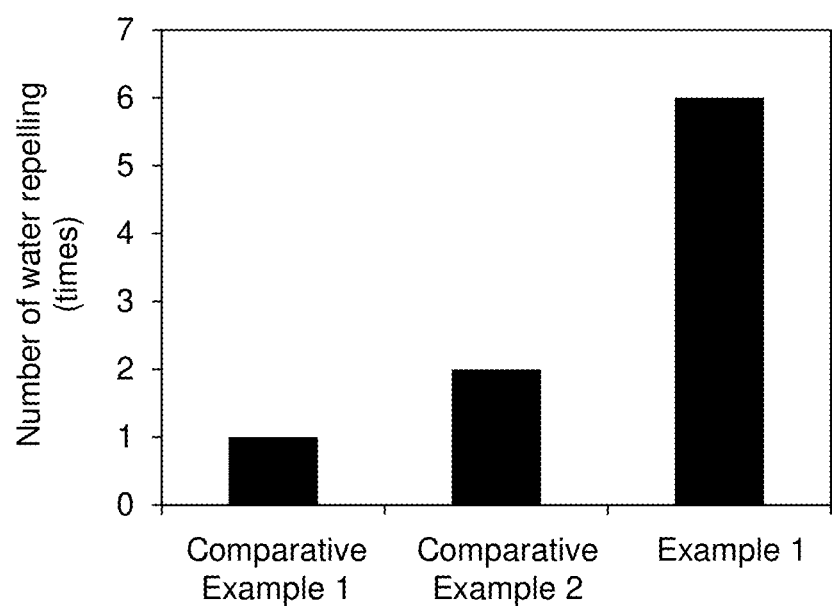
FIG. 4 is a diagram showing the results of water repellent tests performed on the porous protective layers of Example 1 and Comparative Examples 1 and 2.

With regard to the porous protective layers of Example 1 and Comparative Examples 1 and 2, water droplets (dropped amount: 2 μL) were continuously added dropwise onto the surface of a porous protective layer at a high temperature (700° C.), and the number of water repelling was then measured. FIG. 4 shows the results of water repellent tests performed on the porous protective layers of Example 1 and Comparative Examples 1 and 2. As shown in FIG. 4, the number of continuous water repelling of the porous protective layer of Example 1 exhibiting NTC characteristics was significantly increased, in comparison to the porous protective layers of Comparative Examples 1 and 2 exhibiting PTC characteristics. Accordingly, it was demonstrated that, when the weight concentration x % by weight of a coating material and the porosity y % of a porous protective layer are controlled to satisfy the above-described formula (1), so that the porous protective layer is allowed to exhibit NTC characteristics, the water repellency of the porous protective layer upon continuous water pouring is significantly improved in comparison to a porous protective layer exhibiting PTC characteristics.

4. Relationship Between Weight Concentration of Silica and Bond Strength

Figure 5:
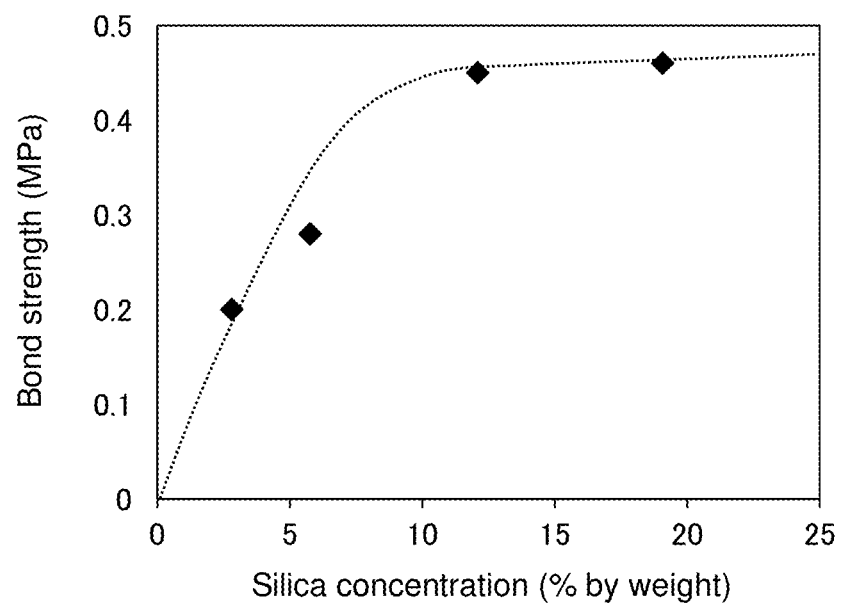
FIG. 5 is a diagram showing the relationship between the weight concentration of silica and bond strength in the Example.

Gas sensor elements, in which the weight concentration of silica with respect to the total weight of the solid contents of alumina and silica in slurry was changed, so that the weight concentration of silica in a porous protective layer was changed, were produced in the same manner as that of the above-described Example 1. The bond strength between the porous protective layer and an element base material mainly constituted with alumina was measured. The weight concentration of silica was set at 2.8% by weight, 5.8% by weight, 12.1% by weight, or 19.1% by weight. FIG. 5 shows the relationship between the weight concentration of silica and the bond strength. As shown in FIG. 5, it was demonstrated that the stable bond strength of the porous protective layer is ensured in a range in which the weight concentration of silica in the porous protective layer is 10% by weight or more.

5. Relationship Between Porosity and Response Characteristic Value

Gas sensor elements, in which the porosity of a porous protective layer was changed, were produced in the same manner as that of Example 1. The porosity of the porous protective layer was set at 10%, 35%, or 69%. When the porosity was 30% or less, the thermal spraying method was applied instead of the dip method.

Figure 6:
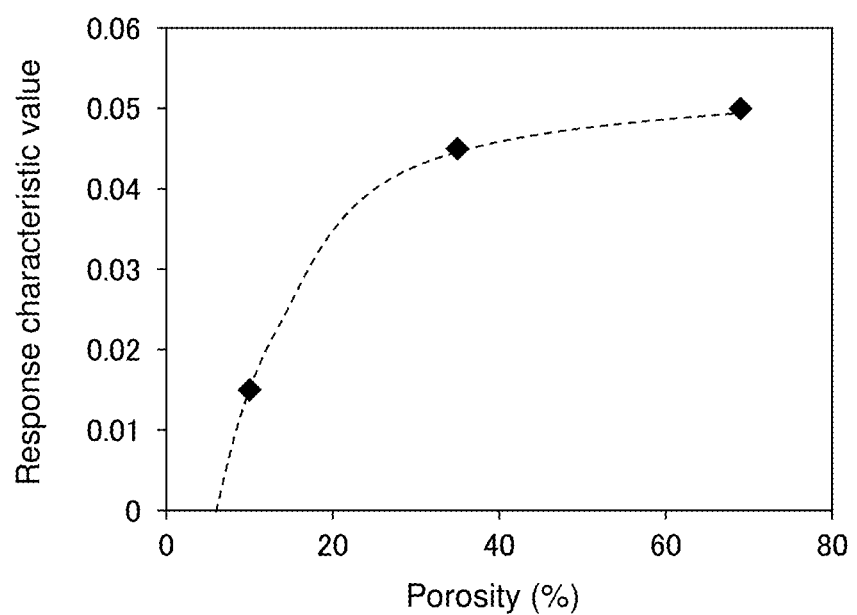
FIG. 6 is a diagram showing the relationship between the porosity of a porous protective layer and the response characteristic value in the Example.

With regard to the produced porous protective layers, the response characteristic value of sensor output, when the exhaust gas atmosphere was largely changed, was measured under an exhaust gas environment in a real engine machine. FIG. 6 shows the relationship between the porosity of a porous protective layer and the response characteristic value. It is to be noted that response sensitivity becomes better, as the response characteristic value is increased. As shown in FIG. 6, it was demonstrated that exhaust gas permeability becomes sufficiently high and favorable response characteristics of sensor output to a change in the exhaust gas are ensured in a range in which the porosity of the porous protective layer is 25% or more.

6. Influence of Baking Temperature

Figure 7:
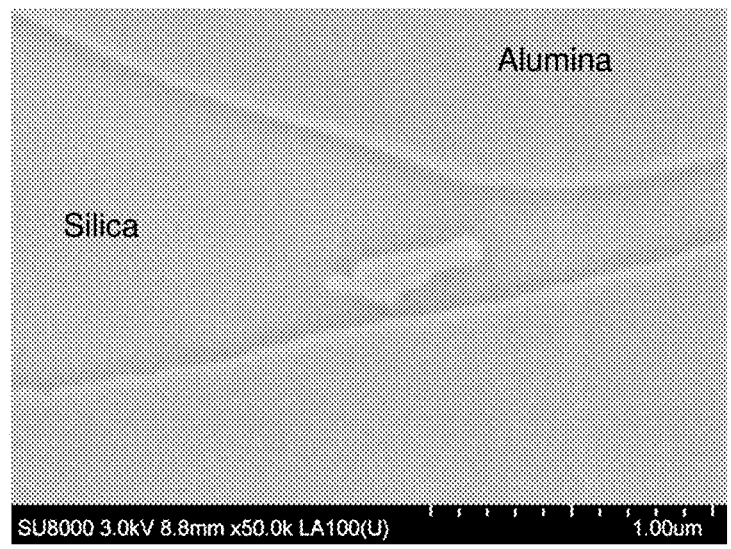
FIG. 7A is a diagram showing a SEM photograph of the porous protective layer of Example 1.
FIG. 7B is a diagram showing a SEM photograph of the porous protective layer of Comparative Example 3.
Figure 7:
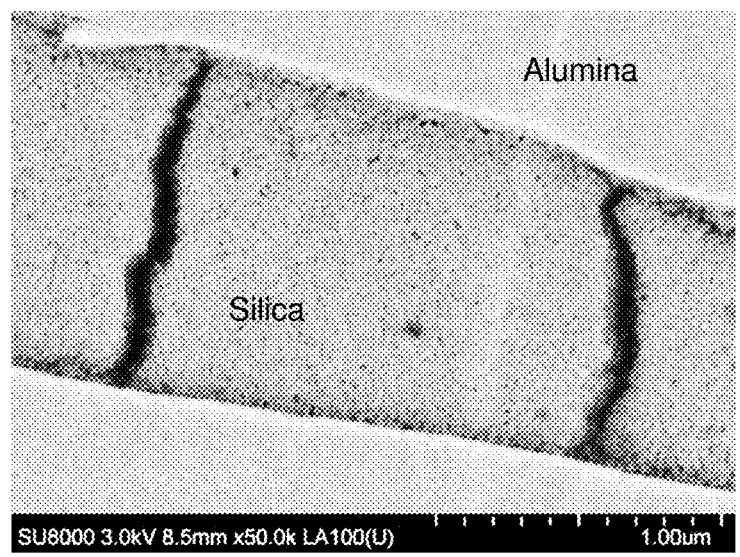
Figure 8:
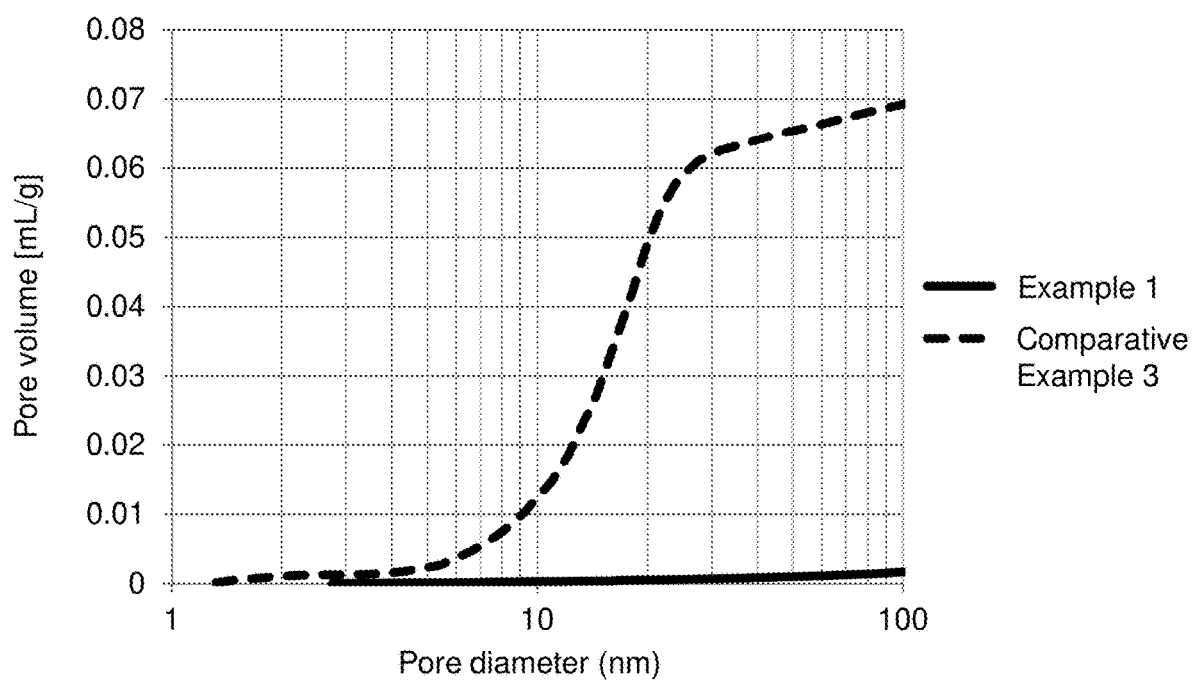
FIG. 8 is a diagram showing the relationship between pore diameter and pore volume, in the porous protective layers of Example 1 and Comparative Example 3.

The influence of the baking temperature in the production of a porous protective layer was examined. A porous protective layer which was formed according to the dip method and was then baked at 1100° C. (Example 1) was compared with a porous protective layer which was formed according to the dip method and was then baked at 900° C. (Comparative Example 3). The porous protective layer of Comparative Example 3 was produced in the same manner as that of Example 1, with the exception that the baking temperature was changed to 900° C. Scanning electron microscope (SEM) photographs of the porous protective layers of Example 1 and Comparative Example 3 are shown in FIG. 7. FIG. 7A shows a SEM photograph of the porous protective layer of Example 1, and FIG. 7B shows a SEM photograph of the porous protective layer of Comparative Example 3. Moreover, FIG. 8 shows the relationship between pore diameter and pore volume, which were measured according to a gas adsorption method, in the porous protective layers of Example 1 and Comparative Example 3. From FIG. 7A, FIG. 7B and FIG. 8, it was found that silica particles used as a coating material were melted in the porous protective layer of Example 1 baked at 1100° C., and that the pore volume of pores with a pore diameter of 100 nm or less was 0.02 mL/g or less. On the other hand, in the porous protective layer of Comparative Example 3 baked at 900° C., silica particles used as a coating material were not sufficiently melted, and the pore volume of pores with a pore diameter of 100 nm or less was significantly larger than that in the porous protective layer of Example 1.

DESCRIPTION OF SYMBOLS

1 Shielding layer
2 Porous diffusive resistance layer
3 Solid electrolyte layer
4 Pair of electrodes
41 Electrode on the measurement target gas side
42 Electrode on the reference gas side
5 Reference gas space protective layer 6 Heat generating source (heater)
7 Heat generating source substrate
8 Measurement target gas space
9 Reference gas space
10 Detection portion
20, 20A Porous protective layer
20Aa Upper layer
20Ab Lower layer
100, 100A, 101 Gas sensor element
103 Gas introduction port All publications, patents, and patent applications cited in this specification are intended to be incorporated herein by reference in their entirety.

What is claimed is:

1. A gas sensor element comprising:
    a detection portion having a stack of a solid electrolyte body and a heat generating body, the solid electrolyte body having at least a pair of electrodes on opposite sides thereof and the heat generating body including a heat generating source; and
    a porous protective layer formed around the detection portion, wherein
    the porous protective layer is formed from an aggregate containing alumina and a coating material containing silica, and
    in the porous protective layer, the weight concentration x % by weight of the coating material with respect to the total weight of the aggregate and the coating material, and the porosity y %, satisfy the following formula (1):

$$y \leq 0.0058x^2 - 1.2666x + 68 \tag{1}$$

and, in the porous protective layer, the pore volume of pores having a pore diameter of 100 nm or less is 0.02 mL/g or less.

2. The gas sensor element according to claim 1, wherein the weight concentration of the coating material in the porous protective layer is 10% by weight or more.

3. The gas sensor element according to claim 1, wherein the porosity of the porous protective layer is 25% or more.

4. A method for producing the gas sensor element according to claim 1, comprising:
    forming a porous protective layer from an aggregate containing alumina and a coating material containing silica around the detection portion; and
    baking the formed porous protective layer at 1000° C. or higher.

* * * * *